(12) United States Patent
An et al.

(10) Patent No.: US 12,120,755 B2
(45) Date of Patent: Oct. 15, 2024

(54) AEROSOL GENERATING DEVICE WITH INDUCTIVE COIL SURROUNDING AN INNER WALL WITH A BODY HEATED BY THE COIL AND SYSTEM USING THE SAME AND METHOD OF MANUFACTURING THEREOF

(71) Applicant: KT&G CORPORATION, Daejeon (KR)

(72) Inventors: Hwi Kyeong An, Seoul (KR); Sang Kyu Park, Hwaseong-si (KR); Seung Won Lee, Gwangmyeong-si (KR)

(73) Assignee: KT&G CORPORATION, Daejeon (KR)

( * ) Notice: Subject to any disclaimer, the term of this patent is extended or adjusted under 35 U.S.C. 154(b) by 1090 days.

(21) Appl. No.: 16/971,041

(22) PCT Filed: Mar. 5, 2020

(86) PCT No.: PCT/KR2020/003113
§ 371 (c)(1),
(2) Date: Aug. 19, 2020

(87) PCT Pub. No.: WO2020/180126
PCT Pub. Date: Sep. 10, 2020

(65) Prior Publication Data
US 2020/0390156 A1    Dec. 17, 2020

(30) Foreign Application Priority Data

Mar. 5, 2019   (KR) ..................... 10-2019-00250046

(51) Int. Cl.
*H04W 76/11*   (2018.01)
*A24F 40/20*   (2020.01)
(Continued)

(52) U.S. Cl.
CPC ............. *H04W 76/11* (2018.02); *A24F 40/20* (2020.01); *A24F 40/465* (2020.01); *A24F 40/50* (2020.01);
(Continued)

(58) Field of Classification Search
CPC ....... H04W 76/11; H04W 24/02; A24F 40/20; A24F 40/465; A24F 40/50; A24F 40/51;
(Continued)

(56) References Cited

U.S. PATENT DOCUMENTS

| 5,613,505 A | 3/1997 | Campbell et al. |
| 6,026,820 A | 2/2000 | Baggett, Jr. et al. |

(Continued)

FOREIGN PATENT DOCUMENTS

| CN | 203492789 U | 3/2014 |
| CN | 105307526 A | 2/2016 |

(Continued)

OTHER PUBLICATIONS

Extended European Search Report dated Apr. 12, 2022 from the European Patent Office in EP Application 20746538.6.

(Continued)

*Primary Examiner* — Justin M Kratt
(74) *Attorney, Agent, or Firm* — Sughrue Mion, PLLC

(57) ABSTRACT

Provided is an aerosol generating device for heating a cigarette to generate aerosol, the aerosol generating device includes an inner wall configured to form an accommodating space for accommodating at least a portion of the cigarette; a coil provided outside the inner wall, surrounding at least a portion of the accommodating space, and configured to generate an induced magnetic field; a heating body provided in the accommodating space and comprising a ferromagnetic substance that generates heat by the induced magnetic field; and a supporting portion configured to support the heating (Continued)

body and integrally molded with the heating body, wherein the inner wall supports the supporting portion and is integrally molded with the supporting portion.

14 Claims, 5 Drawing Sheets

(51) Int. Cl.
| | |
|---|---|
| A24F 40/465 | (2020.01) |
| A24F 40/50 | (2020.01) |
| A24F 40/51 | (2020.01) |
| A24F 40/70 | (2020.01) |
| H05B 6/10 | (2006.01) |
| H05B 6/36 | (2006.01) |
| A24F 40/40 | (2020.01) |
| A24F 40/46 | (2020.01) |
| A24F 40/53 | (2020.01) |
| A24F 40/57 | (2020.01) |
| B22F 7/06 | (2006.01) |
| H04W 24/02 | (2009.01) |
| H05B 6/38 | (2006.01) |

(52) U.S. Cl.
CPC .............. *A24F 40/51* (2020.01); *A24F 40/70* (2020.01); *H05B 6/10* (2013.01); *H05B 6/101* (2013.01); *H05B 6/108* (2013.01); *H05B 6/36* (2013.01); *H05B 6/365* (2013.01); *A24F 40/40* (2020.01); *A24F 40/46* (2020.01); *A24F 40/53* (2020.01); *A24F 40/57* (2020.01); *B22F 7/062* (2013.01); *H04W 24/02* (2013.01); *H05B 6/38* (2013.01)

(58) Field of Classification Search
CPC .......... A24F 40/70; A24F 40/40; A24F 40/46; A24F 40/53; A24F 40/57; H05B 6/10; H05B 6/101; H05B 6/108; H05B 6/36; H05B 6/365; H05B 6/38; B22F 7/062
See application file for complete search history.

(56) References Cited

U.S. PATENT DOCUMENTS

| 9,717,277 B2 | 8/2017 | Mironov |
|---|---|---|
| 10,051,890 B2 | 8/2018 | Mironov et al. |
| 2017/0055580 A1 | 3/2017 | Blandino et al. |
| 2017/0055583 A1 | 3/2017 | Blandino et al. |
| 2017/0055585 A1 | 3/2017 | Fursa et al. |
| 2017/0079326 A1 | 3/2017 | Mironov |
| 2017/0164659 A1 | 6/2017 | Schneider et al. |
| 2018/0192701 A1 | 7/2018 | Stoner |
| 2018/0235278 A1 | 8/2018 | Mahler et al. |
| 2018/0289067 A1 | 10/2018 | Courbat et al. |
| 2019/0230987 A1* | 8/2019 | Wu .......................... H05B 6/36 |
| 2020/0054069 A1 | 2/2020 | Blandino et al. |
| 2020/0086068 A1 | 3/2020 | Lee et al. |
| 2020/0163385 A1* | 5/2020 | Courbat ................ A24F 40/465 |
| 2020/0178605 A1* | 6/2020 | Aw .......................... A24F 40/70 |
| 2020/0214350 A1* | 7/2020 | Courbat ................ A24F 40/465 |

FOREIGN PATENT DOCUMENTS

| CN | 107920602 A | | 4/2018 | | |
|---|---|---|---|---|---|
| CN | 207236100 U | | 4/2018 | | |
| CN | 207766584 U | | 8/2018 | | |
| CN | 108617042 A | | 10/2018 | | |
| CN | 208286365 U | | 12/2018 | | |
| JP | 2018-529324 A | | 10/2018 | | |
| KR | 10-0385395 B1 | | 8/2003 | | |
| KR | 10-1648324 B1 | | 8/2016 | | |
| KR | 10-2017-0008722 A | | 1/2017 | | |
| KR | 20170008722 A | * | 1/2017 | | |
| KR | 1020170007243 A | | 1/2017 | | |
| KR | 1020170133333 A | | 12/2017 | | |
| KR | 1020180033295 A | | 4/2018 | | |
| KR | 1020180129676 A | | 12/2018 | | |
| WO | 2016/124552 A1 | | 8/2016 | | |
| WO | 2018041450 A1 | | 3/2018 | | |
| WO | WO-2018217054 A1 | * | 11/2018 | ............. | A24B 15/16 |
| WO | 2019/020826 A1 | | 1/2019 | | |
| WO | 2019/030301 A1 | | 2/2019 | | |
| WO | 2019/030360 A1 | | 2/2019 | | |
| WO | 2019/030363 A1 | | 2/2019 | | |

OTHER PUBLICATIONS

International Search Report dated Sep. 9, 2020, in International Application No. PCT/KR2020/003113.
Communication dated Aug. 27, 2020, from the Korean Intellectual Property Office in application No. 10-2019-0025046.
Communication dated Jul. 13, 2021 from the Japanese Patent Office in Application No. 2020-541762.
Office Action dated Jan. 5, 2023 from the Chinese Patent Office in Application No. 202080001467.1.

* cited by examiner

[Figure 1]
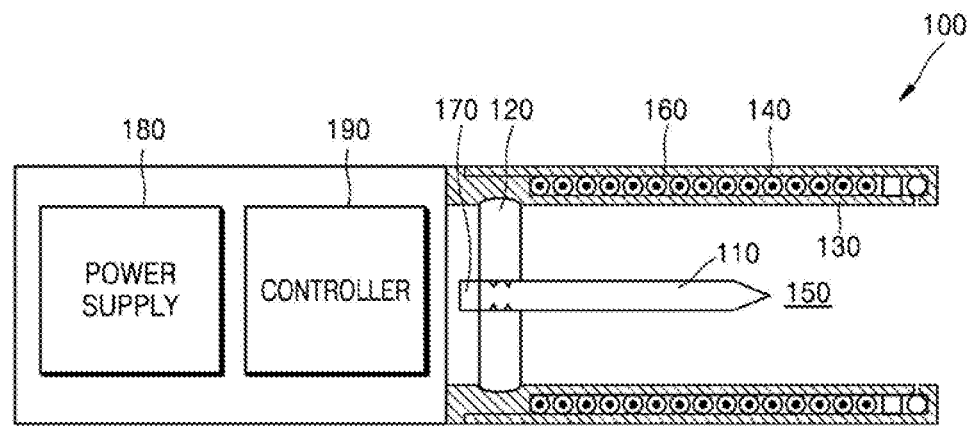
[Figure 2]
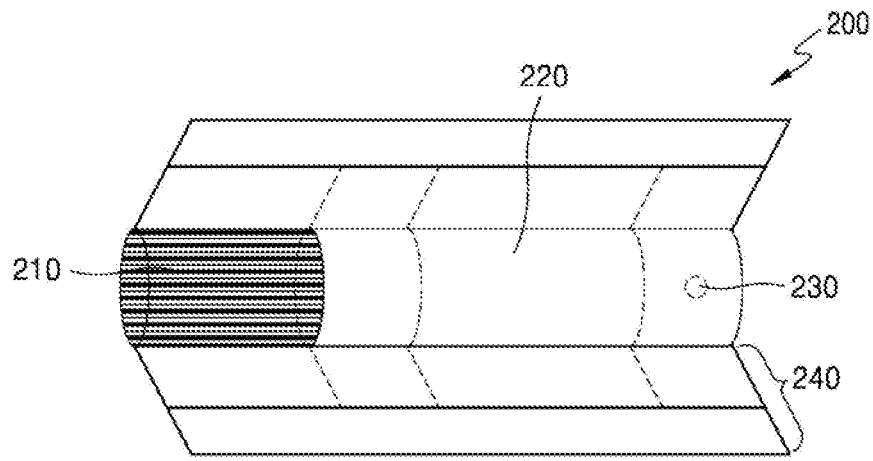

[Figure 3]
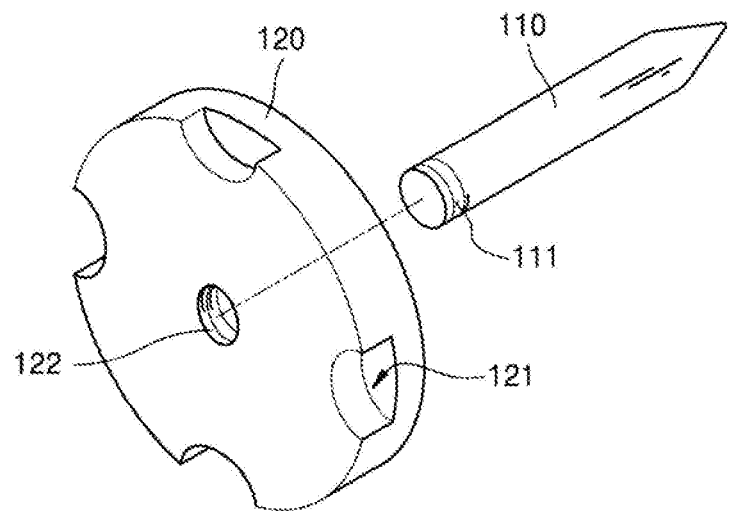
[Figure 4]
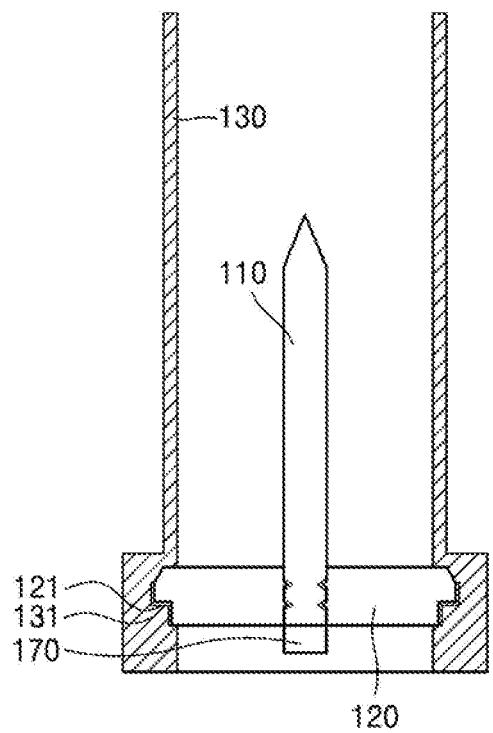

【Figure 5】
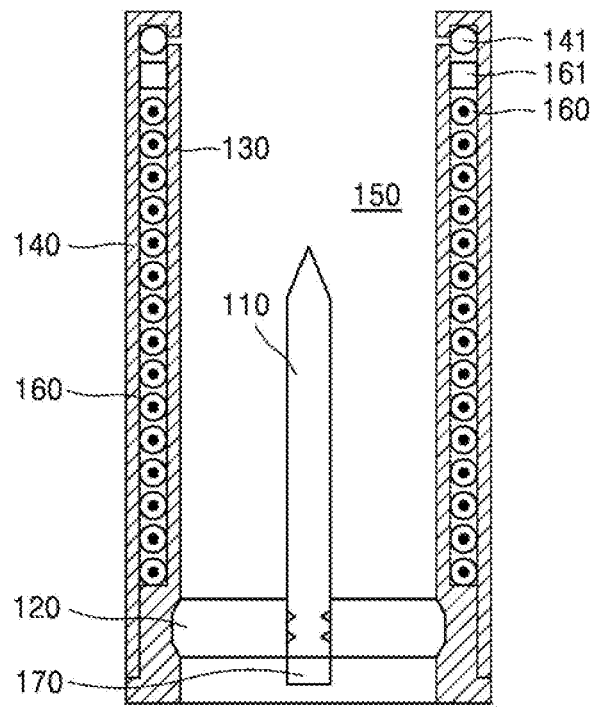
【Figure 6】
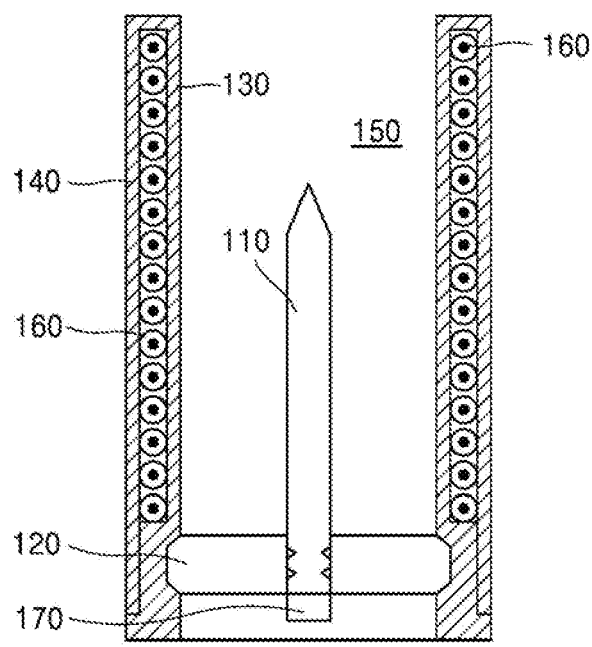

[Figure 7]
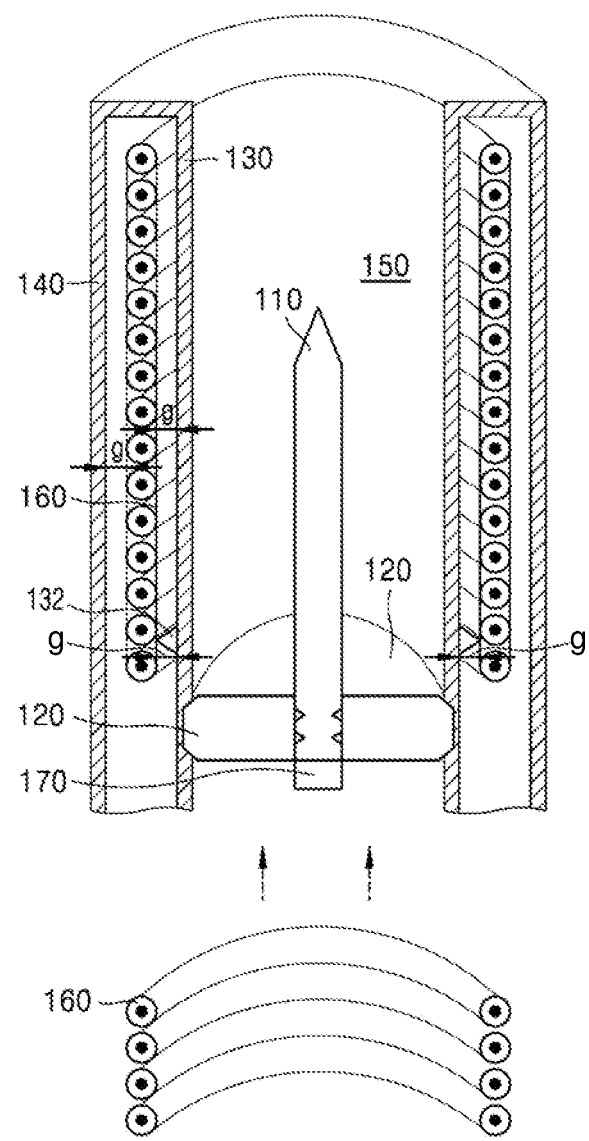

[Figure 8]
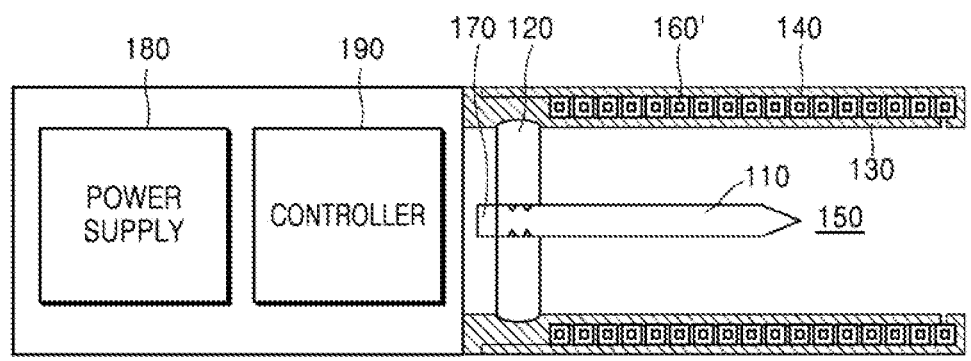
[Figure 9]
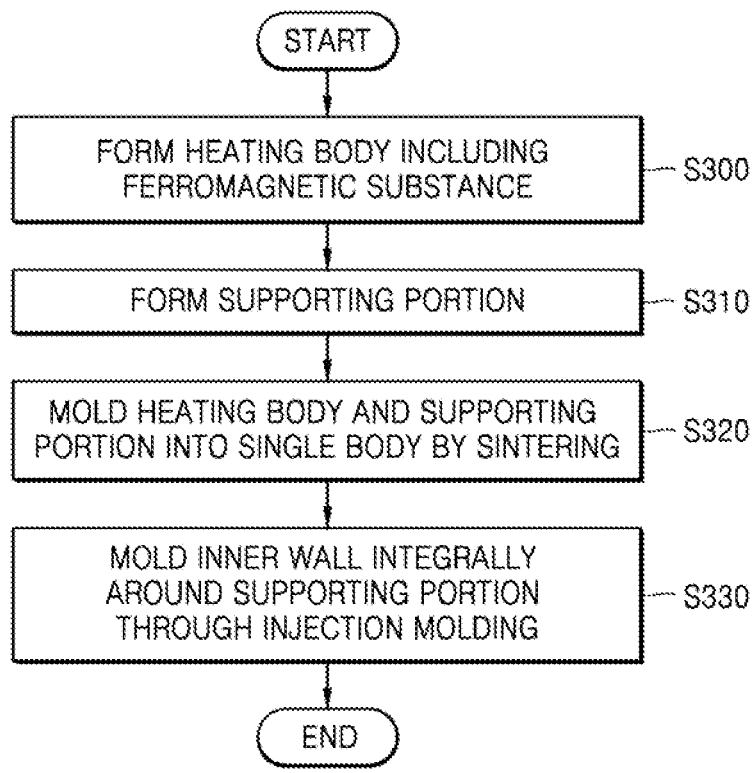

AEROSOL GENERATING DEVICE WITH INDUCTIVE COIL SURROUNDING AN INNER WALL WITH A BODY HEATED BY THE COIL AND SYSTEM USING THE SAME AND METHOD OF MANUFACTURING THEREOF

CROSS REFERENCE TO RELATED APPLICATIONS

This application is a National Stage of International Application No. PCT/KR2020/003113, filed Mar. 5, 2020, claiming priority to Korean Patent Application No. 10-2019-0025046, filed Mar. 5, 2019.

TECHNICAL FIELD

The present disclosure relates to an aerosol generating device, and more particularly, to an aerosol generating device and an aerosol generating system for generating an aerosol by using an induction heating phenomenon.

BACKGROUND ART

Recently, the demand for alternative methods to overcome the shortcomings of general cigarettes has increased. For example, there is an increasing demand for a method of generating aerosol by heating an aerosol generating material in cigarettes, rather than by burning cigarettes.

Accordingly, studies on a heating-type cigarette and a heating-type aerosol generating device have been actively conducted.

In general, a heater such as an electrical resistor may be arranged inside or outside a cigarette accommodated in an aerosol generating device so that the cigarette is heated when power is supplied to the heater.

Studies have been conducted on an induction heating method for heating a cigarette by using a magnetic body and a coil that generates a magnetic field when a current is supplied thereto.

DISCLOSURE OF INVENTION

SOLUTION TO PROBLEM

Exemplary embodiments of the present disclosure provide an aerosol generating device, an aerosol generating system, and a method for manufacturing the aerosol generating device.

Exemplary embodiments of the present disclosure provide an aerosol generating device having improved water resistance, corrosion resistance, heat resistance, and chemical resistance, an aerosol generating system, and a method of manufacturing the aerosol generating device.

Technical problems to be solved by the present disclosure are not limited to the technical problems as described above, and technical problems that are not mentioned will be clearly understood by one of ordinary skill in the art from the present specification and the accompanying drawings.

According to an exemplary embodiment, an aerosol generating device for heating a cigarette to generate aerosol, the aerosol generating device includes an inner wall configured to form an accommodating space for accommodating at least a portion of the cigarette; a coil provided outside the inner wall, surrounding at least a portion of the accommodating space, and generating an induced magnetic field; a heating body provided in the accommodating space and includes a ferromagnetic substance that generates heat due to an induced magnetic field; and a supporting portion, which is configured to support the heating body and is integrally molded with the heating body, wherein the inner wall supports the supporting portion and is integrally molded with the supporting portion.

ADVANTAGEOUS EFFECTS OF INVENTION

In aerosol generating devices according to the exemplary embodiments, an induction heating type heating body, a supporting portion, and an inner wall are integrally formed. As such, a waterproof structure may be maintained even in a high temperature environment without separate waterproof members installed at coupling portions therebetween.

Also, the supporting portion may have characteristics such as heat resistance, chemical resistance, and corrosion resistance by including a material like glass or a ceramic.

The exemplary embodiments may have other advantageous effects other than the above-described effects, as will be clearly understood by one of ordinary skill in the art from the present specification and the accompanying drawings.

BRIEF DESCRIPTION OF DRAWINGS

FIG. 1 is a schematic cross-sectional view of an aerosol generating device according to an exemplary embodiment;

FIG. 2 is a schematic exploded view of a cigarette that generates an aerosol by being heated by an aerosol generating device according to the exemplary embodiment shown in FIG. 1;

FIG. 3 is a schematic exploded perspective view showing a coupling relationship between some of the components of the aerosol generating device according to the exemplary embodiment shown in FIG. 1;

FIG. 4 is a cross-sectional view showing coupling states of some of the components of the aerosol generating device according to the exemplary embodiment shown in FIG. 1;

FIG. 5 is a exemplary cross-sectional view showing a combined state that the aerosol generating apparatus according to the exemplary embodiment shown in FIG. 4;

FIG. 6 is a schematic cross-sectional view of an aerosol generating device according to another exemplary embodiment;

FIG. 7 is a schematic perspective view of an aerosol generating device according to another exemplary embodiment;

FIG. 8 is a schematic cross-sectional view of an aerosol generating device according to another exemplary embodiment; and FIG. 9 is a flowchart of a method of manufacturing an aerosol generating device according to an exemplary embodiment.

BEST MODE FOR CARRYING OUT THE INVENTION

According to an exemplary embodiment, an aerosol generating device for heating a cigarette to generate aerosol, the aerosol generating device includes an inner wall configured to form an accommodating space for accommodating at least a portion of the cigarette; a coil provided outside the inner wall, surrounding at least a portion of the accommodating space, and configured to generate an induced magnetic field; a heating body provided in the accommodating space and comprising a ferromagnetic substance that generates heat by the induced magnetic field; and a supporting portion configured to support the heating body and integrally molded with the heating body, wherein the inner wall supports the supporting portion and is integrally molded with the supporting portion.

A projection may be formed on any one of the inner wall and the supporting portion, and a groove for accommodating the projection may be formed in the other one of the inner wall and the supporting portion.

The aerosol generating device may further include an outer wall provided outside the inner wall, spaced apart from the inner wall, and forms a space between the inner wall and the outer wall, wherein the coil may be provided in the space formed between the inner wall and the outer wall.

The aerosol generating device may further include a sealing ring for sealing at a coupling portion between the inner wall and the outer wall.

The inner wall and the outer wall may be integrally molded.

The coil may be spaced apart from the inner wall and the outer wall.

The inner wall may include a protrusion protruding outwardly to support the coil.

The area of a cross-section of the protrusion may decrease in an outward direction from the inner wall toward the coil, thereby establishing a line contact between the protrusion and the coil.

A height of the protrusion may be 0.01 mm to 0.2 mm.

The coil may have a circular or polygonal cross-sectional shape.

The aerosol generating device may further include a temperature sensor configured to measure a temperature of the heating body.

A space may be formed inside a lower end portion of the heating body in a lengthwise direction, and a contact-type temperature sensor may be installed on an inner surface of the heating body near an upper end portion of the space.

According to another exemplary embodiments, an aerosol generating system includes the aerosol generating device; and a cigarette accommodated in the aerosol generating device.

According to another exemplary embodiments, a method of manufacturing an aerosol generating device, the method includes forming a heating body including a ferromagnetic substance that generates heat due to an induced magnetic field; forming a supporting portion support the heating body; molding the heating body and the supporting portion into a single body by sintering; and forming an inner wall integrally with and around the supporting portion through injection molding.

The method may further include, press-inserting the heating body into the supporting portion before the molding of the heating body and the supporting portion.

The method may further include, forming an outer wall integrally with the inner wall such that the outer wall is provided outside the inner wall and spaced apart from the inner wall; and installing a coil configured to generate an induced magnetic field in the space formed between the inner wall and the outer wall.

MODE FOR THE INVENTION

With respect to the terms in the various exemplary embodiments, the general terms which are currently and widely used are selected in consideration of functions of structural elements in the various exemplary embodiments of the present disclosure. However, meanings of the terms can be changed according to intention, a judicial precedence, the appearance of a new technology, and the like.

In addition, in certain cases, a term which is not commonly used can be selected. In such a case, the meaning of the term will be described in detail at the corresponding portion in the description of the present disclosure.

Therefore, the terms used in the various exemplary embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements.

In addition, the terms "-er", "-or", and "module" described in the specification mean units for processing at least one function and operation and can be implemented by hardware components or software components and combinations thereof.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure.

The disclosure may, however, be embodied in many different forms and should not be construed as being limited to the exemplary embodiments set forth herein.

Throughout the specification, an aerosol generating device may be a device that generates an aerosol by using an aerosol generating material to generate an aerosol that may be directly inhaled into a user's lungs through the user's mouth.

For example, the aerosol generating device may be a holder.

Throughout the specification, "puff" refers to an inhalation of a user, and the inhalation may refer to a situation of drawing an aerosol to the user's mouth, nasal cavity, or lung through the user's mouth or nose.

FIG. 1 is a schematic cross-sectional view of an aerosol generating device according to an exemplary embodiment.

As shown in FIG. 1, an aerosol generating device 100 according to the exemplary embodiment may include a heating body 110, a supporting portion 120, an inner wall 130, an outer wall 140, an accommodating space 150, and a coil 160, a temperature sensor 170, a power supply 180, and a controller 190.

However, exemplary embodiments are not limited thereto, and additional general-purpose components other than the components shown in FIG. 1 may be further included in the aerosol generating device 100.

The aerosol generating device 100 may generate aerosol by heating a cigarette accommodated in the aerosol generating device 100 through induction heating.

The induction heating may refer to a method of generating heat from a magnetic body by applying an alternating magnetic field, which has magnetic flux that changes its direction periodically, to the magnetic body. As a result, the magnetic body may generates heat.

When an alternating magnetic field is applied to the magnetic body, energy loss may occur in the magnetic body, which may result from eddy current loss and hysteresis. The energy loss may appear as heat energy emitted from the magnetic body.

The greater the amplitude or the frequency of the alternating magnetic field applied to the magnetic body is, the more heat energy the magnetic body may emit.

The aerosol generating device 100 may transmit the heat energy emitted from the magnetic body to a cigarette.

The magnetic body that generates heat by an external magnetic field may be a susceptor. The susceptor may be provided in the aerosol generating device 100 or inside a cigarette. For example, the susceptor may be included in the heating body 110 provided inside the aerosol generating device 100. The susceptor may be manufactured in the form of slices, flakes, or strips.

According to exemplary embodiments, the susceptor may include a metal or carbon. The susceptor may include at least one of ferrite, a ferromagnetic alloy, stainless steel, and aluminum (Al).

Furthermore, the susceptor may also include graphite, molybdenum, silicon carbide, niobium, niobium, a nickel alloy, a metal film, a ceramic like zirconia, a transition metal such as nickel (Ni) and cobalt (Co), and a metalloid like boron (B) and phosphorus (P).

According to an exemplary embodiment, the susceptor may be included in the heating body 110 provided in the aerosol generating device 100.

Installing the susceptor in the aerosol generating device 100 may have various advantages, compared with a case where the susceptor is included in the cigarette.

For example, non-uniform generation of aerosol and flavor due to non-uniform distribution of a susceptor material inside a cigarette may be resolved.

Also, since the heating body 110 including the susceptor is provided in the aerosol generating device 100, the temperature of the heating body 110 that generates heat through induction heating may be directly measured and provided to the aerosol generating device 100. As a result, the temperature of the heating body 110 may be precisely controlled.

The aerosol generating device 100 may include the inner wall 130 forming the accommodating space 150 for accommodating at least a portion of the cigarette.

The accommodating space 150 may include an opening that is opened to the outside of the accommodating space 150.

A cigarette may be inserted into the aerosol generating device 100 through the opening of the accommodating space 150.

The heating body 110 may be provided inside the accommodating space 150.

The heating body 110 may be coupled to the supporting portion 120 formed at an inner end of the accommodating space 150, and the supporting portion 120 may support the heating body 110.

A cigarette may be pushed into the accommodating space 150 until it reaches the supporting portion 120 such that the heating body 110 is inserted into the cigarette.

The supporting portion 120 may include a material such as glass or ceramic to obtain characteristics such as heat resistance, chemical resistance, and corrosion resistance.

When the heating body 110 and the supporting portion 120 are separate parts (i.e., combined in a detachable manner), a waterproof member may be provided at a coupling portion between the heating body 110 and the supporting portion 120 to prevent condensed aerosol in the accommodating space 150 from leaking into the aerosol generating device 100. In this case, when the heating body 110 is heated through induction heating, the waterproof member is deformed or damaged because the entire heating body 110 may be uniformly heated to a high temperature. As a result, it is difficult to maintain the waterproof member at the coupling portion between the heating body 110 and the supporting portion 120.

In the aerosol generating device 100 according to the exemplary embodiment shown in FIG. 1, the heating body 110 and the supporting portion 120 may be integrally formed.

Also, the inner wall 130 may support the supporting portion 120, and the supporting portion 120 and the inner wall 130 may be integrated with each other to provide a waterproof structure at the coupling portion between the supporting portion 120 and the inner wall 130.

For example, the heating body 110 and the supporting portion 120 may be integrally formed by sintering, and the inner wall 130 may be integrally formed around the outer surface of the supporting portion 120 by injection.

As a result, a waterproof structure may be maintained even in a high temperature environment, without requiring a waterproof member to be provided at the coupling portion between the heating body 110, the supporting portion 120, or at the coupling portion between the supporting portion 120 and the inner wall 130.

The outer wall 140 is placed to be apart from the inner wall 130 on the outer side of the inner wall 130, thereby forming a space between the inner wall 130 and the outer wall 140.

The aerosol generating device 100 may include the coil 160 for applying an alternating magnetic field to the heating body 110, and the coil 160 may be provided in the space between the inner wall 130 and the outer wall 140.

In other words, the coil 160 may be wound around the accommodating space 150 and the heating body 110.

The coil 160 may receive power from the power supply 180.

The controller 190 of the aerosol generating device 100 may generate a magnetic field by controlling a current flowing in the coil 160, and an induction current may be generated in the heating body 110 due to the magnetic field.

This induction heating is a known phenomenon that may be explained by the Faraday's Law of induction and the Ohm's Law. Specifically, the induction heating uses a phenomenon that an electric field is changed in the conductor as magnetic induction in the conductor is changed.

As described above, when an electric field is generated in a conductor, an eddy current flows in the conductor according to Ohm's law, and the eddy current generates heat proportional to a current density and an electrical resistance of the conductor.

Heat generated at the heating body 110 may be transferred to an aerosol generating material and vaporizes the aerosol generating material, thereby generating aerosol.

In other words, when electric power is supplied to the coil 160, a magnetic field may be formed by the coil 160.

When an alternating current is applied to the coil 160 from the power supply 180, the direction of the magnetic field formed by the coil 160 may be periodically changed.

When the heating body 110 is exposed to an alternating magnetic field that is formed by the coil 160, the heating body 110 may generate heat and a cigarette accommodated in the aerosol generating device 100 may be heated.

When the amplitude or the frequency of the alternating magnetic field formed by the coil 160 is changed, the temperature of the heating body 110 for heating a cigarette may also be changed.

The controller 190 may control power supplied to the coil 160 to adjust the amplitude or the frequency of the alternating magnetic field formed by the coil 160, thereby controlling the temperature of the heating body 110.

For example, the coil 160 may be implemented as a solenoid.

A conductive wire constituting the solenoid may include copper (Cu).

However, exemplary embodiments are not limited thereto, and the conductive wire constituting the solenoid may include any one of silver (Ag), gold (Au), aluminum (Al), tungsten (W), zinc (Zn), and nickel (Ni) or an alloy including at least one thereof as a material having a low specific resistance to allow a high current to flow.

In one exemplary embodiment, the aerosol generating device 100 may further include the temperature sensor 170 for measuring the temperature of the heating body 110.

The temperature sensor 170 may measure the temperature of the heating body 110 in a contact manner or a non-contact manner.

The temperature sensor 170 may be a type of sensor that is not affected by a magnetic field applied by the coil 160.

As in the exemplary embodiment shown in FIG. 1, the heating body 110 may penetrate through the supporting portion 120, such that the temperature of the heating body 110 may be measured by the temperature sensor 170. Therefore, the temperature sensor 170 may measure the temperature of the heating body 110 by directly contacting the heating body 110.

In another exemplary embodiment, a contact-type temperature sensor may be inserted into the heating body 110. In other words, the lower end portion of the heating body 110 along the lengthwise direction of the heating body 110 may be hollow, and a contact-type temperature sensor may be positioned on an inner surface of the heating body 110 near the upper end of the inner space. In this case, since the contact-type temperature sensor is positioned on the center of the interior of the heating body 110, the temperature of the heating body 110 may be measured more quickly and accurately than when the contact-type temperature sensor is located at an end of the heating body 110.

In another exemplary embodiment, the temperature sensor 170 may include an infrared sensor that measures the temperature of the heating body 110 without contacting the heating body 110. When the temperature of the heating body 110 is measured through the infrared sensor, a structure for connecting the heating body 110 and the temperature sensor 170 may not be needed, and thus the design of the aerosol generating device 100 may be simplified.

The power supply 180 of the aerosol generating device 100 may supply power to components of the aerosol generating device 100.

For example, the power supply 180 can supply power for the coil 160 to generate a magnetic field.

The magnitude of the power supplied to the coil 160 may be controlled by a control signal generated by the controller 190.

The power supply 180 may include a rechargeable battery, e.g., a nickel cadmium (Ni—Cd) battery, an alkaline battery, a nickel hydride (Ni—Mh) battery, a hermetic lead acid (SLA) battery, a lithium ion (Li-ion) battery, and a lithium polymer (Li-polymer) battery.

The power supply 180 may include a battery that supplies a direct current and a converter that converts a direct current (DC) supplied from the battery into an alternating current (AC) to be supplied to the coil 160.

The power supply 180 may include a regulator for maintaining a constant voltage of the battery, between the battery and the controller 190.

The controller 190 of the aerosol generating device 100 may control the components included in the aerosol generating device 100, such as the coil 160, the power supply 180, and the heating body 110 by generating and transmitting control signals.

For example, the controller 190 may apply a current to the coil 160 by using power from the power supply 180.

The controller 190 may be implemented as an array of a plurality of logic gates or may be implemented as a combination of a general purpose microprocessor and a memory in which a program executable in the microprocessor is stored.

Also, the controller 190 may include a plurality of processing elements.

Although not shown, the controller 190 may further include an input receiver for receiving a button input or a touch input of a user, a communicator capable of performing a communication with an external communication device like a user terminal, a display that displays state information regarding the aerosol generating device 100, and a pulse width modulation processor for controlling the pulse width of power applied to the coil 160.

FIG. 2 is a schematic exploded view of a cigarette that generates aerosol when heated by an aerosol generating device according to the exemplary embodiment shown in FIG. 1.

Referring to FIG. 2, the cigarette 200 includes a tobacco rod 210 and a filter rod 220.

The filter rod 220 illustrated in FIG. 2 is illustrated as a single segment, but is not limited thereto. In other words, the filter rod 220 may include a plurality of segments. For example, the filter rod 220 may include a first segment configured to cool aerosol and a second segment configured to filter a certain component included in the aerosol. Also, as necessary, the filter rod 220 may further include at least one segment configured to perform other functions.

The cigarette 200 may be packaged using at least one wrapper 240. The wrapper 240 may have at least one hole through which external air may be introduced or internal air may be discharged.

For example, the cigarette 200 may be packaged using one wrapper 240.

As another example, the cigarette 200 may be double-packaged using at least two wrappers 240.

For example, the tobacco rod 210 may be packaged using a first wrapper, and the filter rod 220 may be packaged using a second wrapper.

Also, the tobacco rod 210 and the filter rod 220, which are respectively packaged using separate wrappers, may be coupled to each other, and the entire cigarette 200 may be packaged using a third wrapper.

When each of the tobacco rod 210 and the filter rod 220 includes a plurality of segments, each segment may be packaged using a separate wrapper.

Also, the entire cigarette 200 including the plurality of segments, which are respectively packaged using the separate wrappers and which are coupled to each other, may be re-packaged using another wrapper.

The tobacco rod 210 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto.

Also, the tobacco rod 210 may include other additives, such as flavors, a wetting agent, and/or organic acid.

Also, the tobacco rod 210 may include a flavored liquid, such as menthol or a moisturizer, which is injected to the tobacco rod 210.

The tobacco rod 210 may be manufactured in various forms. For example, the tobacco rod 210 may be formed as a sheet or a strand. Also, the tobacco rod 210 may be formed as a pipe tobacco, which includes tiny bits cut from a tobacco sheet.

Also, the tobacco rod 210 may be surrounded by a heat conductive material. For example, the heat-conducting material may be, but is not limited to, a metal foil such as aluminum foil.

The heat conductive material surrounding the tobacco rod 210 may uniformly distribute heat transmitted to the tobacco rod 210, and thus, the heat conductivity of the tobacco rod may be increased. As a result, the taste of the tobacco may be improved.

The filter rod 220 may include a cellulose acetate filter.

Shapes of the filter rod 220 are not limited. For example, the filter rod 220 may include a cylinder-type rod or a tube-type rod having a hollow inside. Also, the filter rod 220 may include a recess-type rod. When the filter rod 220 includes a plurality of segments, at least one of the plurality of segments may have a different shape.

The filter rod 220 may be formed to generate flavors.

For example, a flavoring liquid may be injected onto the filter rod 220, or an additional fiber coated with a flavoring liquid may be inserted into the filter rod 220.

Also, the filter rod 220 may include at least one capsule 230 for generating a flavor or aerosol. For example, the capsule 230 may have a configuration in which a liquid containing a flavoring material is wrapped with a film. For example, the capsule 230 may have a spherical or cylindrical shape, but is not limited thereto.

When the filter rod 220 includes a segment configured to cool the aerosol, the cooling segment may include a polymer material or a biodegradable polymer material. For example, the cooling segment may include pure polylactic acid alone, but the material for forming the cooling segment is not limited thereto. In some exemplary embodiments, the cooling segment may include a cellulose acetate filter having a plurality of holes. However, the cooling segment is not limited to the above-described example and any other cooling segment that is capable of cooling the aerosol may be used.

Although not shown, the cigarette 200 may further include a front-end plug. The front-end plug may be located on a side of the tobacco rod 210, the side not facing the filter rod 220. The front-end plug may prevent the tobacco rod 210 from being detached and may prevent the liquefied aerosol from flowing from the tobacco rod 210 into the aerosol generating device 100 during smoking.

FIG. 3 is a schematic exploded perspective view showing a coupling relationship between some components of the aerosol generating device according to the exemplary embodiment shown in FIG. 1.

Also, FIG. 4 is a cross-sectional view showing coupling states of some components of the aerosol generating device according to the exemplary embodiment shown in FIG. 1.

Referring to FIG. 3, a concave portion 111 may be formed on a surface of the heating body 110 where the heating body 110 and the supporting portion 120 are coupled to each other.

Also, corresponding to the concave portion 111 on the heating body 110, a convex portion 122 may be formed on a coupling surface of the supporting portion 120.

Accordingly, the heating body 110 and the supporting portion 120 may prevent relative movement with respect to each other by engaging with each other through the concave portion 111 and the convex portion 122. As a result, when the heating body 110 and the supporting portion 120 are integrally formed by sintering, coupling strength in the lengthwise direction of the heating body 110 may be improved.

Reversely, a convex portion may be formed on the heating body 110, and a concave portion may be formed on the supporting portion 120.

Referring to FIGS. 3 and 4, a groove 121 may be formed on a surface of the supporting portion 120 to be coupled with the inner wall 130, and a projection 131 corresponding to the groove 121 may be formed on the inner wall 130.

In other words, when the supporting portion 120 and the inner wall 130 are integrally formed, the projection 131 of the inner wall 130 is accommodated in the groove 121 of the supporting portion 120, thereby preventing relative movements of the supporting portion 120 and the inner wall 130 with respect to each other.

Therefore, even when the aerosol generating device is used repeatedly in a high temperature environment, since the coupling between the supporting portion 120 and the inner wall 130 may be stably maintained, relative movements (e.g., rotation, etc.) between the supporting portion 120 and the inner wall 130 may be prevented, thereby keeping the supporting portion 120 and the inner wall 130 being separated from each other.

Alternatively, a projection may be formed in the supporting portion 120, and a groove may be formed in the inner wall 130.

FIG. 5 is an exemplary cross-sectional view showing a combined state of the aerosol generating apparatus according to the exemplary embodiment shown in FIG. 4.

Also, FIG. 6 is a schematic cross-sectional view of an aerosol generating device according to another exemplary embodiment.

Referring to FIG. 5, the inner wall 130 and the outer wall 140 are separated from each other, and the coil 160 is provided in a space between the inner wall 130 and the outer wall 140.

The coil 160 is fixed inside the space by a fixing member 161.

Meanwhile, when a cigarette (200) is inserted into the accommodating space 150 of the aerosol generating device 100 and aerosol is generated, the aerosol may be condensed on the inner wall 130 around the accommodating space 150 and may be leaked into the aerosol generating device 100 through the coupling portion between the inner wall 130 and the outer wall 140.

Therefore, a sealing ring 141 for sealing may be included at the coupling portion between the inner wall 130 and the outer wall 140 to prevent leakage.

FIG. 6 shows another exemplary embodiment for preventing leakage at the coupling portion of the inner wall 130 and the outer wall 140.

In this case, the outer wall 140 and the inner wall 130 are integrally formed, and thus there is no coupling portion between the inner wall 130 and the outer wall 140. As such, sealing may be achieved between the inner wall 130 and the outer wall 140 even without a separate sealing ring.

FIG. 7 is a schematic perspective view of an aerosol generating device according to another exemplary embodiment.

Referring to FIG. 7, after the inner wall 130 and the outer wall 140 are integrally formed, the coil 160 is inserted into a space between the inner wall 130 and the outer wall 140.

At this time, the coil 160 may be arranged to have a predetermined gap g from each of the inner wall 130 and the outer wall 140.

Also, even when the inner wall 130 and the outer wall 140 are separated from each other as in the aerosol generating device according to the exemplary embodiment shown in FIG. 5, the coil 160 may be provided to have the gap g from each of the inner wall 130 and the outer wall 140.

A protrusion 132 protruding outward to support the coil 160 may be formed on the inner wall 130, such that the coil 160 maintains the predetermined gap g from each of the inner wall 130 and the outer wall 140.

When the coil 160 is in contact with the inner wall 130, heat of the heating body 110 may be conducted to the coil 160 through the inner wall 130, and thus the coil 160 may be heated.

Therefore, by maintaining the predetermined gap g between the coil 160 and the inner wall 130, it is possible to reduce the heat transfer from the heating body 110 to the coil 160.

To minimize heat transfer between the coil 160 and the inner wall 130, the protrusion 132 has a tapered shape such that the area of the cross-section thereof decreases in an outward direction from the inner wall 130 toward the coil 160, which allows a line contact between the protrusion 132 and the coil 160.

For example, the cross-sectional shape of the protrusion 132 may be a triangle or a reuleaux triangle including gentle curves.

In addition, since the magnetic field generation efficiency decreases as the distance between the coil 160 and the heating body 110 increases, the height of the protrusion 132 may be from about 0.01 mm to about 0.2 mm, preferably from about 0.03 mm to about 0.1 mm, and, more preferably, about 0.05 mm.

As shown in FIG. 7, no protrusion is formed on the outer wall 140.

A protrusion may not be necessary on the outer wall 140 if the protrusion 132 on the inner wall 130 alone provides sufficient support force to the coil 160.

Also, if a protrusion is formed on the outer wall 140, since the heat transfer (conduction) may also occur between the outer wall 140 and the coil 160 through the protrusion, heat may be released from the aerosol generating device 100 through the outer wall 140, which may lead to an increase in power consumption.

Therefore, the protrusion 132 for supporting the coil 160 may be formed only on the inner wall 130.

FIG. 8 is a schematic cross-sectional view of an aerosol generating device according to another exemplary embodiment.

The coil 160 has a circular cross-sectional shape in the exemplary embodiment shown in FIG. 1, whereas a coil 160' has a rectangular cross-sectional shape in FIG. 8.

When the cross-sectional shape of the coil 160' is rectangular, the center of the coil is uniformly aligned in a row.

Also, when the height of the cross-section of the rectangular coil 160' is the same as the diameter of the circular coil 160, an induced magnetic field may be stronger.

Therefore, the aerosol generating device 100 may exhibit higher efficiency by employing the rectangular coil 160' than the circular coil 160.

The cross-sectional shape of the coil is not limited to a particular shape, and may vary. For example, the cross-sectional shape of the coil may be a polygonal shape, such as a triangular shape or a pentagonal shape.

FIG. 9 is a flowchart of a method of manufacturing an aerosol generating device according to an exemplary embodiment.

The method of manufacturing an aerosol generating device according to the exemplary embodiment shown in FIG. 9 includes forming a heating body including a ferromagnetic substance that emits heat by an induced magnetic field; forming a supporting portion supporting the heating body; integrally forming the heating body and the supporting portion by sintering; and integrally forming an inner wall around the supporting portion through injection-molding.

First, a heating body including a ferromagnetic body is formed (operation S300), and a supporting portion for supporting the heating body is formed (operation S310).

The heating body and the supporting portion are adhered to each other and molded into a single body (operation S320).

For example, the supporting portion may be primarily formed by injecting and compressing powders for sintering into a mold (frame) for forming the supporting portion.

The heating body and the primary molded supporting portion may be adhered to each other by sintering. In detail, after the heating body is press-inserted into the primary molded supporting portion, the heating body and the supporting portion may be heated at about 900° C. to 1100° C., thereby molding the heating body and the supporting portion into a single body.

Also, an inner wall is molded integrally with the supporting portion (operation S330).

For example, by forming the inner wall around the supporting portion through injection-molding, the supporting portion and the inner wall may be integrally formed.

For example, the injection-molding may be performed to form the inner wall by applying a molten plastic material to the outside of the supporting portion.

Meanwhile, in the exemplary embodiment of FIG. 6, an outer wall may be injection molded integrally with an inner wall, and, after the integral outer wall and the inner wall are injection molded, a coil may be inserted in a space between the inner wall and the outer wall that are integrally formed, and thus an aerosol generating device may be manufactured.

Those of ordinary skill in the art may understand that various changes in form and details can be made therein without departing from the scope of the inventive concept described above.

The disclosed methods should be considered in descriptive sense only and not for purposes of limitation.

The scope of the present disclosure is defined by the appended claims rather than by the foregoing description, and all differences within the scope of equivalents thereof should be construed as being included in the present disclosure.

What is claimed is:

1. An aerosol generating device for heating a cigarette to generate aerosol, the aerosol generating device comprising:
   an inner wall configured to form an accommodating space for accommodating at least a portion of the cigarette;
   a coil provided outside the inner wall, surrounding at least a portion of the accommodating space, and configured to generate an induced magnetic field;

a heating body provided in the accommodating space and comprising a ferromagnetic substance that generates heat by the induced magnetic field;

a supporting portion supporting the heating body and integrally molded with the heating body; and an outer wall provided outside the inner wall and spaced apart from the inner wall, wherein the inner wall supports the supporting portion and is integrally molded with the supporting portion, such that the heating body, the supporting portion, and the inner wall are integrally molded, and wherein the coil is provided in a space between the inner wall and the outer wall and the coil is spaced apart from the inner wall and the outer wall.

2. The aerosol generating device of claim 1, wherein a projection is formed on one of the inner wall and the supporting portion, and wherein a groove for accommodating the projection is formed in remaining one of the inner wall and the supporting portion.

3. The aerosol generating device of claim 1, further comprising a sealing ring for sealing at a coupling portion between the inner wall and the outer wall.

4. The aerosol generating device of claim 1, wherein the inner wall and the outer wall are integrally molded.

5. The aerosol generating device of claim 1, wherein the inner wall comprises a protrusion protruding outwardly to support the coil.

6. The aerosol generating device of claim 5, wherein a cross-sectional area of the protrusion decreases in an outward direction from the inner wall toward the coil, thereby establishing a line contact between the protrusion and the coil.

7. The aerosol generating device of claim 5, wherein a height of the protrusion is 0.01 mm to 0.2 mm.

8. The aerosol generating device of claim 1, wherein the coil has a circular or polygonal cross-sectional shape.

9. The aerosol generating device of claim 1, further comprising a temperature sensor configured to measure a temperature of the heating body.

10. The aerosol generating device of claim 1, wherein a space is formed inside a lower end portion of the heating body in a lengthwise direction, and wherein a contact-type temperature sensor is installed on an inner surface of the heating body near an upper end portion of the space.

11. An aerosol generation system comprising:

the aerosol generating device of claim 1; and the cigarette accommodated in the aerosol generating device.

12. A method of manufacturing an aerosol generating device, the method comprising:

forming a heating body comprising a ferromagnetic substance that generates heat by an induced magnetic field;

forming a supporting portion configured to support the heating body;

molding the heating body and the supporting portion into a single body by sintering;

forming an inner wall integrally with and around the supporting portion through injection molding, such that the heating body, the supporting portion, and the inner wall are integrally molded;

forming an outer wall such that the outer wall is provided outside the inner wall and spaced apart from the inner wall; and installing a coil configured to generate the induced magnetic field in a space formed between the inner wall and the outer wall, wherein the coil is spaced apart from the inner wall and the outer wall.

13. The method of claim 12, further comprising press-inserting the heating body into the supporting portion before the molding of the heating body and the supporting portion.

14. The method of claim 12, further comprising:

forming an outer wall integrally with the inner wall such that the outer wall is provided outside the inner wall and spaced apart from the inner wall; and installing a coil configured to generate the induced magnetic field in a space formed between the inner wall and the outer wall.

* * * * *